United States Patent [19]
Youn et al.

[11] Patent Number: 5,712,780
[45] Date of Patent: Jan. 27, 1998

[54] UNITY POWER FACTOR CONVERTER FOR HIGH QUALITY POWER SUPPLY WITH MAGNETICALLY COUPLED COMPENSATION

[75] Inventors: Myoung Joong Youn; Gun Woo Moon; Young Seok Jung; Chung Wook Roh, all of Daejeon; Che Hong Ahn, Seoul, all of Rep. of Korea

[73] Assignee: Korea Telecommunication Authority, Seoul, Rep. of Korea

[21] Appl. No.: 747,448

[22] Filed: Nov. 12, 1996

[51] Int. Cl.$^6$ .................................................. H02M 7/537
[52] U.S. Cl. .................................................. 363/131; 363/20
[58] Field of Search ................................. 363/15, 16, 20, 363/21, 131

[56] References Cited

U.S. PATENT DOCUMENTS

| | | | |
|---|---|---|---|
| 4,257,087 | 3/1981 | Cuk | 363/16 |
| 4,486,823 | 12/1984 | Palm | 363/21 |
| 4,675,796 | 6/1987 | Gautherin et al. | 363/20 |
| 5,001,620 | 3/1991 | Smith | 363/89 |
| 5,224,025 | 6/1993 | Divan et al. | 363/16 |
| 5,442,536 | 8/1995 | Zimmermann | 363/20 |
| 5,508,904 | 4/1996 | Hara | 363/21 |
| 5,600,546 | 2/1997 | Ho et al. | 363/21 |

*Primary Examiner*—Jeffrey L. Sterrett
*Attorney, Agent, or Firm*—Merchant, Gould Smith, Edell Welter & Schmidt, P.A.

[57] ABSTRACT

The present invention provides a high quality power supply, and more particularly to an improved single-ended converter having the high power factor close to unity. In accordance with the present invention, the power supply comprises a power source, a low-pass filter, a rectifier including an inductor, a transformer primary coil, a transformer secondary coil, a ripple energy storing capacitor, a switching controller and an inductance element wound round a core where said transformer primary and secondary coils are wound. The inductance element being coupled to said rectifying means so that compensates a voltage applied to said inductor in said rectifying means with a voltage applied to said transformer primary coil.

6 Claims, 5 Drawing Sheets

UNITY POWER FACTOR CONVERTER FOR HIGH QUALITY POWER SUPPLY WITH MAGNETICALLY COUPLED COMPENSATION

BACKGROUND OF THE INVENTION

1. Field of the Invention

The present invention relates to a high quality power supply, and more particularly to an improved single-ended converter having the high power factor close to unity.

2. Description of the Related Art

Generally, in conventional two-stage converters in compliance with adoption of a standard such as IEC-555-2, it is difficult to rectify harmonic waves and correct the power factor. Also, it is difficult to control the isolated DC-to-DC conversion and the output voltage. As a result, high power is provided even if applications require low power, thereby giving rise to economic losses.

SUMMARY OF THE INVENTION

An object of the present invention is to provide a high quality power supply suitable for low power requirements.

Another object of the present invention is to provide a high quality power supply having a high power factor close to unity, using a simple configuration.

Further, another object of the present invention is to provide a high quality power supply capable of controlling a correct DC output voltage by using the output voltage of the transformer primary coil.

In accordance with an aspect of the present invention, there is provided a power supply including a power source, a low-pass filter, a rectifying means including an inductor, a transformer primary and secondary coils, a ripple energy storing means and a switching control means, said power supply comprising: an inductance element wound around a core where said transformer primary and secondary coils are wound, being coupled to said rectifying means, whereby said inductance element compensates a voltage applied to said inductor in said rectifying means with a voltage applied to said transformer primary coil.

In accordance with another aspect of the present invention, there is provided a single-ended power supply including a rectifying means, a transformer primary and secondary coils, a switching control means, said power supply comprising: a magnetic induction means coupling said rectifying means to said transformer primary coil so that said magnetic induction means compensates a voltage applied to said rectifying means with a voltage applied to said transformer primary coil and then varies a current through said rectifying means.

BRIEF DESCRIPTION OF THE DRAWINGS

Other objects and aspects of the invention will become apparent from the following description of embodiments with reference to the accompanying drawings, in which.

DETAILED DESCRIPTION OF THE INVENTION

Hereinafter, the present invention will be described in detail referring to the accompanying drawings.

Figure 1:
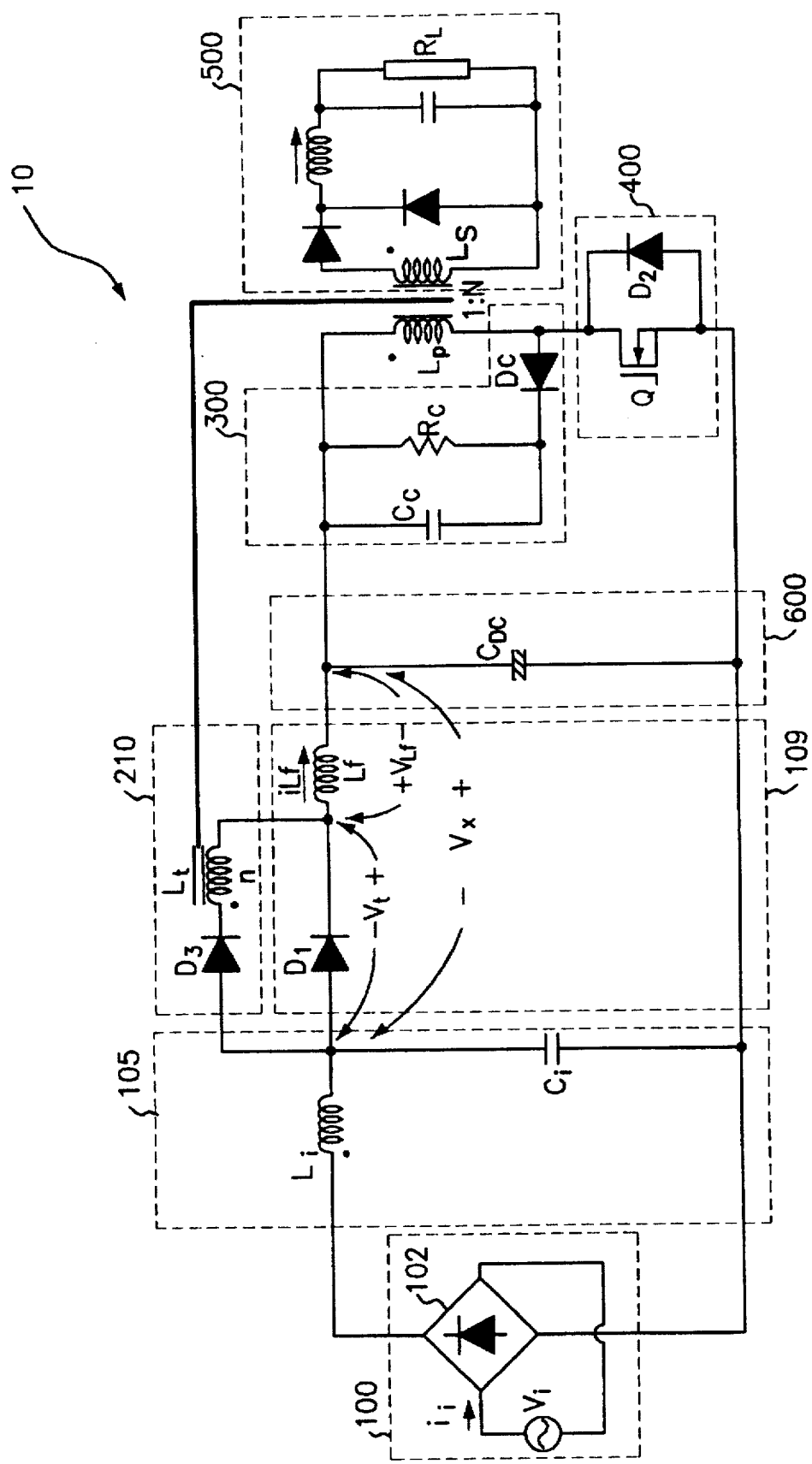
FIG. 1 is a schematic circuit diagram of the unity power factor converter in accordance with the present invention.

First, FIG. 1 is a schematic circuit diagram of the unity power factor converter in accordance with the present invention. The converter 10 shown in FIG. 1 is based on a conventional forward converter.

The converter 10 has a transformer primary circuit and a transformer secondary circuit 500. Typically, the transformer primary circuit includes a power supplying part 100, a low-pass filter 105, a rectifier 109, a capacitor 600 for storing the ripple energy, a clamping circuit 300, a switching controller 400, and a transformer primary coil $L_P$. The transformer secondary circuit 500 is well-known to those having ordinary skill in the prior art and is not described in detail.

Referring again to FIG. 1, the current $i_i$ from the power source $V_i$ is rectified by a bridge rectifier 102, and the rectified current is applied to the low-pass filter 105 having an inductor $L_i$ and a capacitor $C_i$. The current through the low-pass filter 105 is rectified again by the rectifier 109 which includes a diode $D_1$ and an inductor $L_f$. The diode $D_1$ is coupled to the inductor $L_f$ in series. The rectifier 109 is coupled to the capacitor 600 in parallel for storing the 120 Hz ripple energy arising in a single-phase high quality power converter. Also, the capacitor 600 is coupled in parallel to the clamping circuit 300 which is coupled to the transformer primary coil $L_P$ in parallel. The switching controller 400, having a diode $D_2$ and a transistor Q, is coupled to the clamping circuit 300 and the transformer primary coil $L_P$.

The present invention further provides a magnetic coupled stage 210 including a diode $D_3$ and an inductor $L_r$. The magnetic coupled stage 210 is coupled in parallel to the diode D1 within the rectifier 109. The coil of the inductor $L_r$ is wound round the same transformer core where the coils of the inductors $L_P$ and $L_S$ are wound. The magnetic coupled stage 210 creates a voltage $V_r$ which is modulated in response to the switching frequency. That is, the magnetic coupled stage 210 reflects the transformer primary voltage on the voltage $V_r$. The high frequency component of the voltage $V_r$ is rectified by the inductor $L_f$, and then the voltage $V_X$ is created so that the voltage $V_X$ is added to the input voltage $V_i$. The DC link capacitor $C_{DC}$ absorbs the 120 Hz ripple energy required in the high quality power factor converter.

Figure 2:
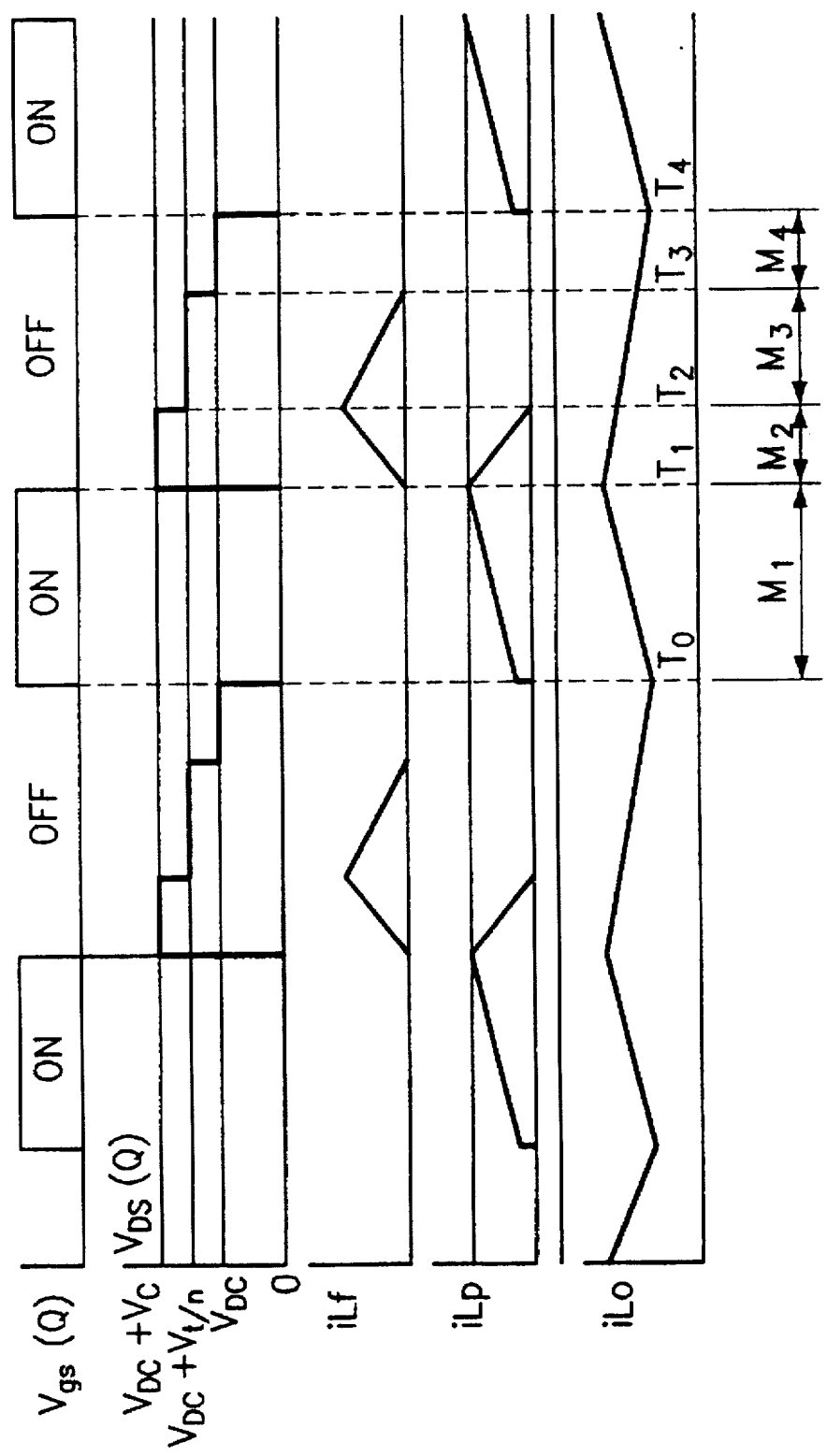
FIG. 2 is a graph showing the voltage and current applied to main elements within the circuit shown in FIG. 1.

As shown in FIG. 2, the present invention has four distinct intervals. During the first interval M1, the transistor Q is turned on, and the voltage $V_{DS}$ applied to the transistor Q is at 0. However, at the time the transistor Q is turned off, the voltage $V_{DS}$ quickly increases and then it becomes the sum of $V_C$ (the voltage applied to the capacitor $C_C$ in the clamping circuit 300) and $V_{DC}$ (the voltage applied to the capacitor $C_{DS}$). During the second interval M2, the voltage $V_{DC}+V_C$ is maintained. Since the transformer primary voltage is clamped to $V_C$ by the clamping circuit 300, the current $iL_f$ through the inductor $L_f$ linearly increases until the volt-second product condition $V_{DC}(T1+T0)=V_C(T2-T1)$ is satisfied.

Since the coils of the inductors $L_P$ and $L_r$ are wound round the same core, the current $iL_P$ linearly decreases but the current iLf linearly increases because the potential at the point (connection to the diode $D_3$) which is dotted is larger than that at the point which is not dotted. The current $iL_f$ has a predetermined slop $((|V_i|+V_t)-V_{DC})/L_f$. After the transformer is completely reset (iLp is 0), the current $iL_f$ may not increase because the voltage $V_t$ modulated at the magmatic coupled stage 210 is determined by the voltage of the capacitor $C_{DC}$. Accordingly, the current $iL_f$ linearly decreases zero voltage during the interval M3. After the interval M3, the interval M4 operates in a discontinuous condition mode.

Figure 3:
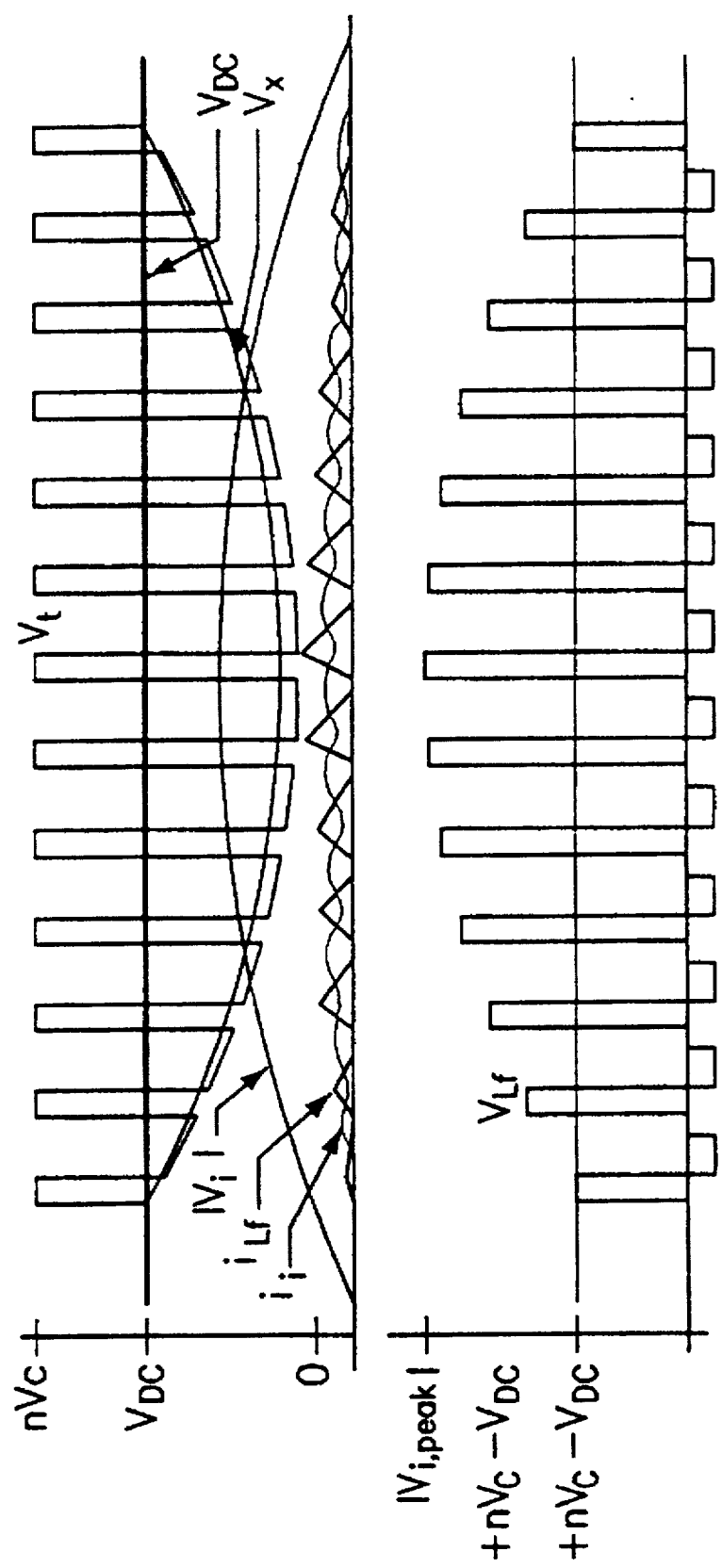
FIG. 3 is a graph showing DC coupling waveforms to illustrate the power factor improvement in accordance with the present invention.

FIG. 3 is a graph showing DC coupling waveforms to illustrate the power factor improvement in accordance with the present invention in which shown is an ideal DC link waveform illustrating how to correct the power factor. The inductor $L_t$ of the magnetic coupled stage 210 generates the voltage $nV_C$ (n is the number of turns in the primary) with a small pulse width. The pulse has the same width as determined by the reset condition of the transformer. The voltage $V_t$ of FIG. 1 operates in a disconnection condition mode with the magnetic coupled stage 210. The maximum current through the inductor $L_f$ is modulated by AC line voltage and responses to the high frequency voltage pulse having DC off-set voltage $nV_C - V_{DC}$. In a conventional power factor correction circuit, a voltage drop of about 2-4V is generated at diodes in a bridge rectifier and a filter, and a dead zone is created in the vicinity of the zero line voltage of the input voltage. According to the present invention, the converter obtains a sinusoidal input current which has no dead zone, by compensating the diodes' voltage drop with DC off-set voltage.

In a normal state, the average current of the current $iL_f$ through the inductor $L_f$ for one period is as follows:

$$I_{Lf,avg} = k \frac{p\sin\omega t + q}{1 - p\sin\omega t} \quad (1)$$

where $$K = \frac{(V_i + nV_c - V_{DC})f_{sw}(T_2 - T_1)^2 L_t}{2L_f^2}$$

$$p = \frac{V_{i,max}}{V_{DC}} \quad q = \left(1 + \frac{L_f}{L_t}\right)\left(\frac{nV_c}{V_{DC}} - 1\right)$$

Figure 4:
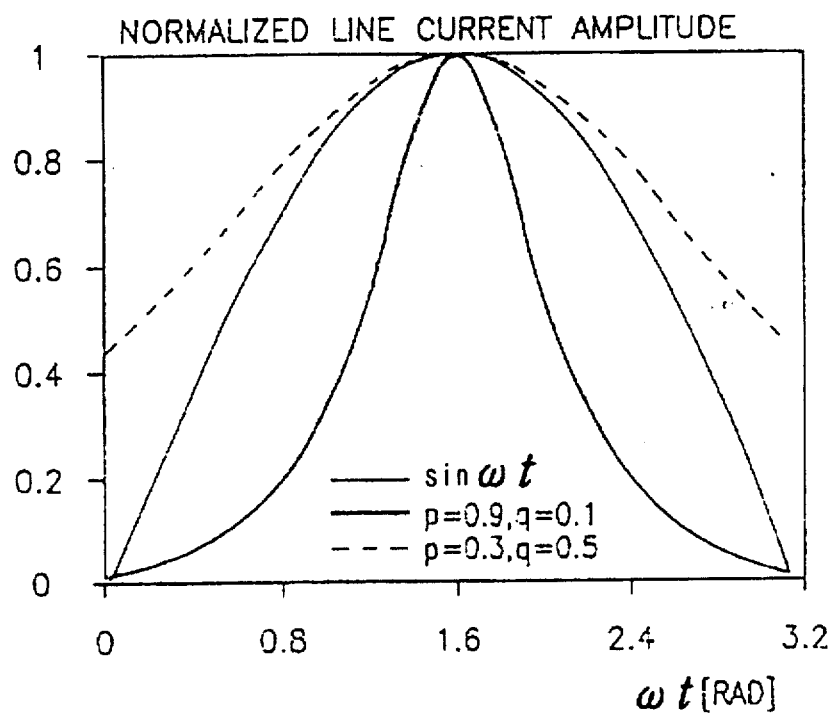
FIG. 4 is a graph showing a normalized line current amplitude to angular velocity in the input stage of FIG. 1.

By controlling the values p and q, the desired power supply can be achieved. That is, the selection of the appropriate p and q makes the input current sinusoidal. FIG. 4 is a graph showing a normalized line current amplitude to angular velocity in the input stage of FIG. 1. In FIG. 4, the line current amplitude normalized to the maximum input current of the normal input voltage is shown together with a normal sinusoid. The dotted line shows the amplitude when p and q are respectively 0.3 and 0.5 and the solid line drawn in bold stroke shows the amplitude when p and q are respectively 0.9 and 0.1.

Figure 5:
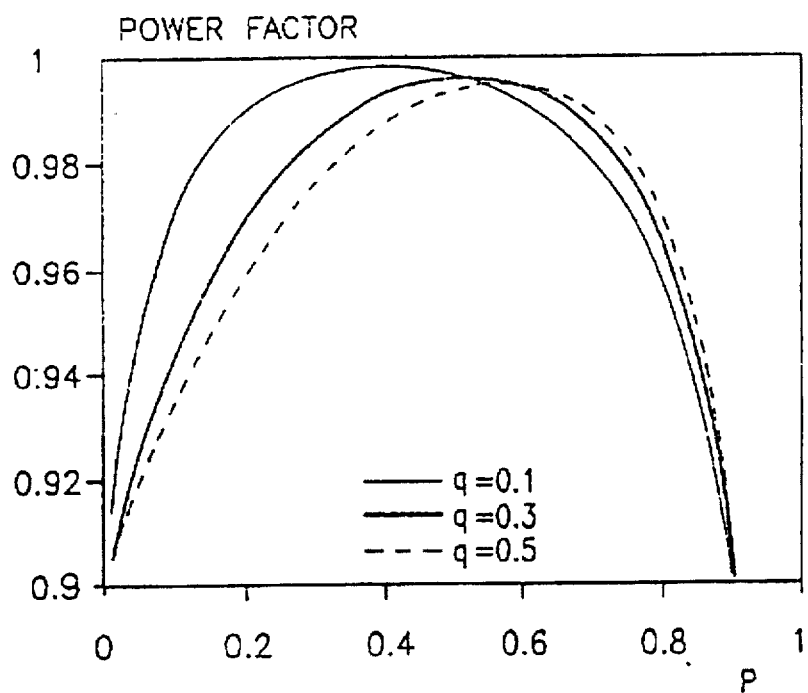
FIG. 5 is a graph showing an improved power factor in accordance with the present invention.

FIG. 5 is a graph showing an improved power factor in accordance with the present invention. Typically, the harmonic distortion of the input current may be expressed as functions of a maximum input current, DC link voltage and the number of turns of the magnetic coupled stage 210.

By using the equation (1), the power factor according to the present invention derives from the function of p and q. Therefore, it is possible to design the inverter having a low harmonic distortion of the input current and the inverter is close to unity.

In an embodiment of the present invention, the inverter is designed to have the switching frequency of 11 KHz, the AC voltage of 100V RMS, the DC output voltage of 48V. Also, the turn ratio (n) in the magnetic coupled stage 210 is 0.96.

Figure 6:
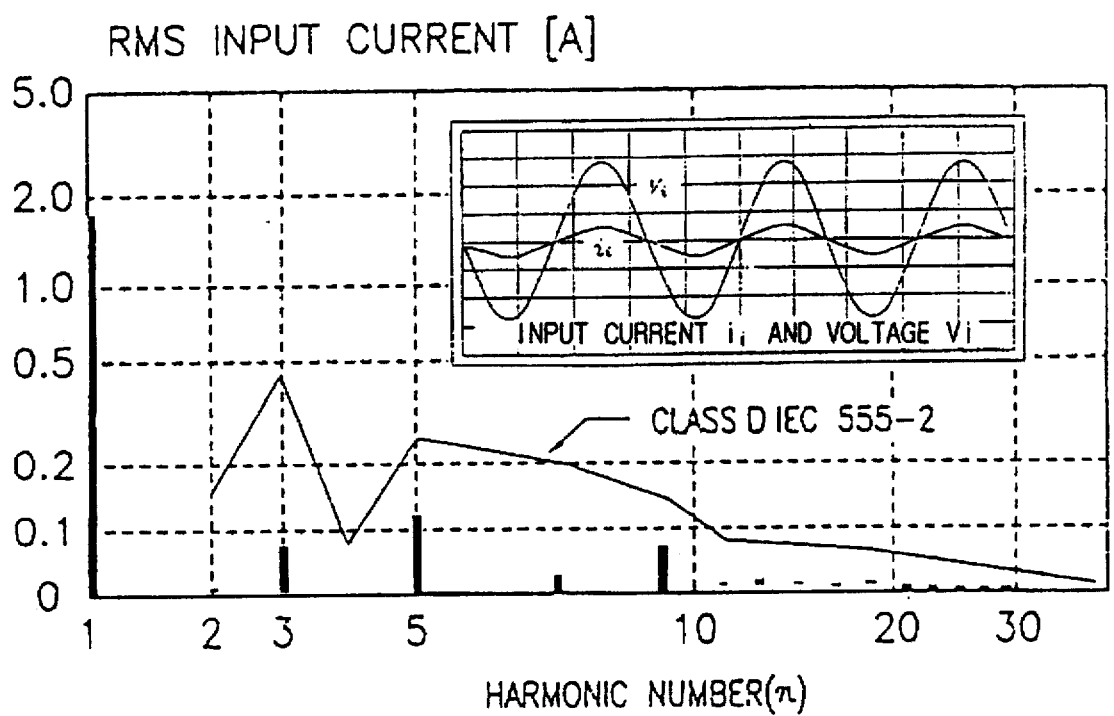
FIG. 6 is a graph showing a variation of the RMS (root-means-square value) input current to the harmonic number.

FIG. 6 is a graph showing RMS (root-means-square value) of input current to the harmonic number in compliance with adoption of standard such as IEC-555-2. As shown in FIG. 6, the power factor correction is achieved by using the magnetic coupled stage 210 and the power factor is 0.985.

As is apparent from the above-mentioned description, the present invention has a excellent power factor, decreases harmonic distortion because of a low harmonic component in the input current, and exactly controls the output voltage with a single controller. Also, the present invention provides a high quality AC current, a controlled DC output having a quick transient response and a high quality power supply suitable for low power capacity in compliance with adoption of standards such as IEC-555-2.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A power supply including a power source, a low-pass filter including an inductor, a transformer primary and secondary coils, a ripple energy storing means and a switching control means, said power supply comprising:

a rectifying means including a first diode and an inductor connected in series, the rectifying means coupled to the low-pass filter; and a magnetic induction means including an inductance element and a second diode, said magnetic induction means being coupled to said first diode in parallel, said inductance element being wound around a core where said transformer primary and secondary coils are wound and being coupled to said rectifying means;

whereby said inductance element compensates a voltage applied to said inductor in said rectifying means with a voltage applied to said transformer primary coil.

2. A power supply in accordance with claim 1, wherein said power supply further comprises a clamping means coupled to said transformer primary coil in parallel.

3. A power supply in accordance with claim 2, wherein said power supply is a forward convertor.

4. A single-ended power supply including a transformer primary and secondary coils, a switching control means, a low-pass filter, a clamping means, said power supply comprising:

a rectifying means including a first diode and a first inductor coupled in series to said first diode; and a magnetic induction means coupling said rectifying means to the transformer primary coil so that said magnetic induction means compensates a voltage applied to said rectifying means with a voltage applied to the transformer primary coil and then varies a current through said rectifying means, said magnetic induction means including a second inductor wound around a transformer core together with the transformer primary and secondary coils, said magnetic induction means being coupled to said first diode in parallel.

5. A single-ended power supply in accordance with claim 4, wherein said magnetic induction means further comprises a second diode coupled to said first inductor in series.

6. A single-ended power supply in accordance with claim 5, wherein said single-ended power supply is a forward converter.

* * * * *

UNITED STATES PATENT AND TRADEMARK OFFICE
CERTIFICATE OF CORRECTION

PATENT NO. : 5,712,780

DATED : JANUARY 27, 1998

INVENTOR(S) : YOUN ET AL.

It is certified that error appears in the above-identified patent and that said Letters Patent is hereby corrected as shown below:

Title page of patent, the foreign priority data [30] is missing. Please insert --Republic of Korea 11/13/95 1995-41115--

Column 2, line 39, "$L_r$" should read --$L_t$--.

Column 2, line 47, "$V_r$" should read --$V_t$--.

Column 2, line 64, "(T1+T0)" should read --(T1-T0)--.

Column 3, line 6, "magmatic" should read --magnetic--.

Column 4, line 1, "means" should read --mean--.

Signed and Sealed this

Nineteenth Day of January, 1999

Attest:

Attesting Officer

*Acting Commissioner of Patents and Trademarks*